Nov. 13, 1956

R. A. GAISER 2,770,558

METHOD OF PRODUCING MIRRORS

Filed Dec. 13, 1952

Inventor
Romey A. Gaiser
Nobbe & Swope
Attorneys

2,770,558
METHOD OF PRODUCING MIRRORS

Romey A. Gaiser, Toledo, Ohio, assignor to Libbey-Owens-Ford Glass Company, Toledo, Ohio, a corporation of Ohio Application December 13, 1952, Serial No. 325,829

1 Claim. (Cl. 117—35)

The present invention relates to mirrors, and more particularly to special types of mirrors in which the reflecting coating is in the form of a clear, transparent, substantially colorless film of relatively high reflectivity.

This application is a continuation-in-part of my copending application Serial No. 774,361 and now abandoned, filed September 16, 1947.

Generally speaking, the reflecting coatings on the mirrors of this invention are extremely thin films of materials having a higher refractive index than the base or mirror plate to which they are applied. For example, they may be films of tin oxide having a thickness of the order of one-quarter wave length of that portion of the visible spectrum to which the human eye is most sensitive (around 5600 Angstroms) on a vitreous substance such as glass, or, more precisely expressed, they may be quarter wave length, three-quarter wave length, or five-quarter wave length films of the reaction product of a tin compound on a vitreous surface heated to a temperature below its softening point.

Films of this character may be used in a number of different ways and for a variety of different purposes, and I have found them to be especially valuable as reflecting surfaces for special types of mirrors such as non-glare rear vision mirrors for automobiles, transparent mirrors, and so forth.

The principal object of the invention is to provide a reflecting coating of the general character discussed above, having light reflecting characteristics in a range of approximately 18 to 22 percent, on a suitable surface or base.

Another object is the provision of a non-glare rear vision mirror which is highly efficient under the varying light conditions encountered in driving at all hours of the day and night.

Still another object is to provide a special type mirror which is made up of a glass mirror plate and a clear, transparent, substantially colorless, reflecting coating on a surface of the plate.

Other objects and advantages of the invention will become more apparent during the course of the following description, when taken in connection with the accompanying drawings.

In the drawings, wherein like numerals are employed to designate like parts throughout the same:

Figure 1:
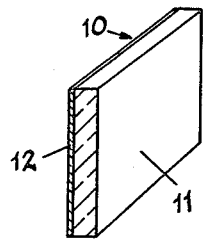
Fig. 1 is a perspective view of a rear vision mirror made in accordance with the invention.

Referring now more particularly to the drawings, a preferred form of rear vision mirror has been illustrated in Fig. 1. As there shown, the mirror, which is designated in its entirety by the numeral 10, comprises a relatively opaque mirror plate 11 of colored glass, such as black Vitrolite, with a quarter wave length film of tin oxide 12 on one surface thereof to provide a front surface mirror.

The film of tin oxide may be applied to the surface of the glass by first heating the glass to a predetermined temperature, then exposing it to the action of a suitable tin compound for a sufficient length of time to form a clear transparent relatively high reflecting coating, and discontinuing the treatment before a noticeable fog or objectionable color appears. One way of accomplishing this is by means of the apparatus illustrated in Fig. 3.

In carrying out the process, individual mirror plates, such as the plate 11, which have been precut to size, can be treated. Or, a relatively large sheet or plate of glass, such as has been illustrated at 13, can be first filmed and then cut up into appropriate sizes for the finished mirrors.

In either case, the glass plate to be filmed is supported in suitable fashion, as on the tongs 14, and then introduced into a furnace 15 where it is heated to the proper temperature for filming. The furnace 15 may be of the pit type as shown, or it may be a tunnel type furnace through which the glass sheets are continuously moved, or any other type of heating means can be used that will heat the glass uniformly to the desired temperature.

In choosing the proper filming temperature, the glass must be hot enough to assure a satisfactory deposition of tin oxide on the surface, and I have found that very little filming will take place below 750 degrees Fahrenheit. It is also important that the glass not be too hot. Temperatures immediately around the softening point of the glass will change the optical characteristics of the plate. There is also a tendency for the glass surface to flow at this temperature, which impairs definition; and high temperatures result in loss of surface flatness.

These conditions are objectionable in producing mirrors, and especially so in the case of one-way or so-called transparent mirrors. For practical purposes even a temperature of 1100 degrees Fahrenheit has been found to be rather high, and temperatures outside of a range between 750 degrees Fahrenheit and a point below the softening point of the mirror plate are not recommended. I have found a temperature of approximately 800 degrees Fahrenheit to be best suited for the purpose from all standpoints and this temperature is the preferred one.

Figure 3:
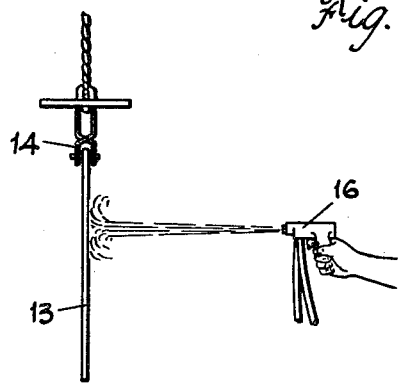
Fig. 3 is a diagrammatic illustration of apparatus that may be used in applying the reflecting coating to a mirror plate or other vitreous article.

After heating to the desired temperature, the glass sheet is removed from the furnace, as shown at position A in Fig. 3, where it is exposed to the action of a tin compound in fluid form to produce the required film. One way of doing this is to spray the hot glass with a solution of stannic chloride in alcohol, using a suitable spray gun 16.

However, the invention is not restricted to any specific method of applying the tin oxide coating, and this can be accomplished by exposing the heated vitreous substance to the vapors of tin compounds such as stannic chloride, stannic bromide, stannic iodide, etc.; or by spraying the hot surface with, or dipping it in, solutions of tin compounds such as stannous chloride, stannic tetrachlordie, etc. For example, excellent results have been obtained by spraying glass heated to 800 degrees Fahrenheit with a solution of anhydrous stannic tetrachloride in isopropyl alcohol. A solution of one part stannic tetrachloride in nine parts of isopropyl alcohol by volume is very satisfactory, but ranges of one to 50 parts of the tin chloride to 19 to 50 parts of the alcohol can also be used.

In spraying the sheet with the solution of the tin compound, it is important that care be taken to produce a uniform film. Spraying is continued until a film of the desired reflection characteristics is obtained and the spraying should be stopped before objectionable color appears. As a practical matter, this can be done visually by a trained operator. However, photoelectric cells connected with suitable recording instruments can be used, if desired, to measure the film as it is being applied, and to indicate when the desired thickness is attained.

With a glass mirror plate at a temperature of 800 degrees Fahrenheit and using a 10% solution of stannic tetrachloride in isopropyl alcohol, a film having a thickness of one-quarter wave length of yellow green light around 5600 Angstroms will be deposited in from 8 to 10 seconds.

The chemical action which takes place at the glass-air interface when the hot glass is exposed to the solution of stannic tetrachloride is not completely understood, but it is known that stannic tetrachloride hydrolyzes to form stannic hydroxide or orthostannic acid.

$$SnCl_4 + 4HOH \rightarrow Sn(OH)_4 + 4HCl$$

At the temperature of the reaction the stannic hydroxide would become $SnO_2$ or $H_2SnO_3$.

$$Sn(OH)_4 \rightarrow SnO_2 + 2H_2O$$
$$Sn(OH)_4 \rightarrow H_2SnO_3 + H_2O$$

On the other hand, it is recognized that a complex tin compound may be formed and that the possibility exists for the formation of a stannate of calcium at the elevated temperature used. However, all of the experiments that we have performed lead us to the belief that it is the presence of stannic oxide that is responsible for the properties of the film.

In order to better understand the high reflecting characteristics of the film and just what takes place at the film surface, and also at the interface between the film and the glass, it will be helpful to consider Fresnel's theoretical light phenomenon as involved in this invention.

When light from one transparent medium passes into another transparent medium at normal incidence, which is sufficient to discuss for the present purpose, a percentage of the light is reflected into the medium from whence it came. This fraction is equal to $$\left(\frac{n_1 - n_2}{n_1 + n_2}\right)^2$$

of the impinging light where $n_1$ is the refractive index of the one medium and $n_2$ is the refractive index of the other medium.

Thus, for soda-lime-silica glass of index of refraction of 1.52 surrounded by an air medium, the percent reflection from one glass surface would be $$\left(\frac{1.52 - 1}{1.52 + 1}\right)^2$$

or 4.25% of the impinging light.

However, if the glass is surfaced with a film of index of refraction of other than 1.52, the above phenomenon must be considered not only at the air-film interface, but also must be considered at the film-glass interface. This can be better understood by referring to Fig. 4 of the drawings which shows diagrammatically a body of glass G having a film of transparent tin oxide F thereon and surrounded by an air medium A.

Figure 4:
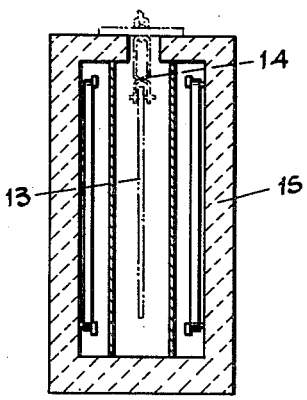
Fig. 4 is a diagrammatic view of a filmed glass sheet showing the action of light rays at the film face and at the interface between the film and the glass.

For the sake of simplicity and to effectively diagram the superposition of rays along a path of normal incidence, the diagram of Fig. 4 has been segmented so that each part of a ray which is reflected at the separate interfaces may be shown individually rather than superimposed. R is a ray of light normally incident on the film surface at point P where a portion $R_1$ is reflected and a portion T is transmitted. The ray T is incident at the film-glass interface at the point $P_1$ where a portion $R_2$ is reflected and a portion $T_1$ is transmitted.

As a theoretical example, let the index of refraction of the air $A = 1.00$, of the glass $G = 1.52$, and of the film of tin oxide $F = 2.00$.

Substituting these values in Fresnel's formula $$\left(\frac{2.00 - 1}{2.00 + 1}\right)$$

it is found that the amplitude of $R_1$ is .333. This amplitude is the square root of the reflection that would occur at the air surface if no film phenomenon was present. However, at the film-glass interface, Fresnel's formula must also be applied. Thus, the transmitted ray T whose intensity is only 89% of the original ray R, suffers a loss by reflection at the point $P_1$. The amplitude of this reflected ray is a fraction $$\left(\frac{2.00 - 1.52}{2.00 + 1.52}\right)$$

or .136, of the amplitude of the ray T. Therefore, the amplitude of ray $R_2$ is $$(.136)[\sqrt{(1.00 - .333)^2}] \text{ or } .128.$$

Now, the question arises as to whether or not the amplitude of ray $R_2$ should be vectorially added to or subtracted from the amplitude of ray $R_1$. This question may be easily answered if it is understood (a) that ray $R_1$ by virtue of its reflection from a more dense optical medium has undergone a phase change of 180 degrees while ray $R_2$ has suffered no change of phase, and (b) that the film thickness is important in computing the retardation of the ray $R_2$ behind the ray $R_1$.

Thus, if the film has an optical thickness of one-quarter wave length of monochromatic light $\lambda$, the ray $R_2$ will travel a total path through the film of one-half a wave length and will arrive at point P, one-half a wave length behind ray $R_1$, but due to the 180° reversal of phase of $R_1$, $R_2$ will reinforce $R_1$ and the amplitude will be vectorially additive, or $R_1 + R_2 = R_3$. By the same token, it may be seen that an optical film thickness of $\lambda/2$ of a monochromatic light will result in interference of that light.

Therefore, the amplitudes .333 and .128 in the above example, where the optical film thickness of F is $\lambda/4$, become additive, and as the reflection is the square of the amplitude, the reflection from one surface amounts to 21%.

For the purpose of simplicity, only first order reflections have been discussed in this example.

The films produced in the manner described above are remarkably stable and adhere tenaciously to the glass. They are clear, transparent and substantially colorless, especially in thickness of one-quarter wave length; and when measured on the optical bench they show light reflection characteristics varying from 18 to 22%.

When these films are applied to black soda-lime-silica glass, as illustrated in Fig. 1, the resulting product will provide an attractive, and unusually effective rear view mirror.

As noted above, the reflection characteristics of such a mirror will be between 18% and 22%, and I have found that this degree of reflection, especially in a front surface mirror, is ideally suited for this purpose. This new mirror not only reduces glare from the sun in daylight driving, and headlight glare in night driving, but, even more important, it provides adequate reflection during the difficult dawn and dusk periods, which heretofore have presented a very difficult problem.

Moreover, these black glass mirrors have a much greater light polarizing efficiency than previously used rear vision mirrors, such as galena mirrors, and consequently give greater glare reduction and improve visibility in proportion to the amount of reflection. Tests show that the polarization of light from a piece of black glass with a tin oxide reflecting film is over twice that secured from a galena mirror.

Figure 2:
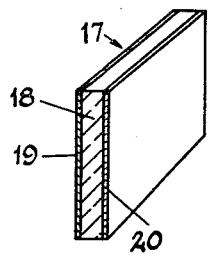
Fig. 2 is another perspective view of a slightly modified form of rear vision mirror.

Similar results can be had with a rear vision mirror of the type shown at 17 in Fig. 2, and in which a transparent glass mirror plate 18 is coated on its front surface with a tin oxide film 19 and on its rear surface with black paint or other light absorbing material 20.

When a transparent mirror plate without an opaque, or light absorbing, backing is filmed with the tin oxide film of this invention it provides a very satisfactory one-way mirror. That is, if such a mirror is mounted in a sight opening between adjacent rooms having different light intensities, the article when viewed from the lighter side will reflect the image of the observer and appear as a mirror, but when viewed from the dark side will appear transparent and permit the observer to look from the darker room into the lighter one.

It is to be understood that the forms of the invention herewith shown and described are to be taken as illustrative embodiments only of the same, and that various changes in the shape, size and arrangement of parts may be resorted to without departing from the spirit of the invention or the scope of the subjoined claim.

I claim:

A method of producing a mirror including a mirror plate of vitreous material and a reflecting coating on a surface thereof, comprising heating said plate to a temperature between approximately 750° F. and a point below the softening point of the vitreous material, spraying the heated plate with a solution consisting essentially of from 1 to 50 parts of a tin compound and from 19 to 50 parts of alcohol until a clear transparent reflective but substantially colorless film of a tin oxide in a thickness of an odd multiple of a quarter wave length of visible light having a wave length of approximately 5600 Angstrom units is formed on a surface thereof, and discontinuing the spray before a noticeable fog or objectionable color appears.

References Cited in the file of this patent

UNITED STATES PATENTS

| | | |
|---|---|---|
| 2,118,795 | Littleton | May 24, 1938 |
| 2,394,533 | Colbert et al. | Feb. 12, 1946 |
| 2,412,496 | Dimmick | Dec. 10, 1946 |
| 2,429,420 | McMaster | Oct. 21, 1947 |
| 2,430,452 | Colbert et al. | Nov. 11, 1947 |
| 2,430,520 | Marboe | Nov. 11, 1947 |
| 2,439,654 | Gaiser et al. | Apr. 13, 1948 |
| 2,478,817 | Gaiser | Aug. 9, 1949 |